US011106547B2

(12) United States Patent
Ciocari et al.

(10) Patent No.: US 11,106,547 B2
(45) Date of Patent: Aug. 31, 2021

(54) OPERATING SYSTEM REPAIRS VIA ELECTRONIC DEVICES

(71) Applicant: HEWLETT-PACKARD DEVELOPMENT COMPANY, L.P., Spring, TX (US)

(72) Inventors: Juliano Francisco Cagnini Ciocari, Porto Alegre (BR); Charles Ricardo Staub, Porto Alegre (BR); Paulo Alcantara, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/478,809

(22) PCT Filed: Nov. 28, 2017

(86) PCT No.: PCT/US2017/063444
§ 371 (c)(1),
(2) Date: Jul. 17, 2019

(87) PCT Pub. No.: WO2019/108165
PCT Pub. Date: Jun. 6, 2019

(65) Prior Publication Data
US 2020/0285548 A1    Sep. 10, 2020

(51) Int. Cl.
*G06F 11/00*    (2006.01)
*G06F 11/14*    (2006.01)
*G06F 13/42*    (2006.01)

(52) U.S. Cl.
CPC ...... *G06F 11/1469* (2013.01); *G06F 11/1464* (2013.01); *G06F 13/4282* (2013.01); *G06F 2201/82* (2013.01); *G06F 2213/0042* (2013.01)

(58) Field of Classification Search
CPC .......................... G06F 11/1469; G06F 11/1464
See application file for complete search history.

(56) References Cited

U.S. PATENT DOCUMENTS 8,386,618 B2    2/2013    Bailey et al.
8,707,086 B2    4/2014    Poisner
(Continued)

FOREIGN PATENT DOCUMENTS

JP            07334442        12/1995
KR      1020150073216 A      6/2016
WO     WO-PCT/US2017/        3/2017
              023370

OTHER PUBLICATIONS

Installing Windows to an EFI-based Computer, Feb. 15, 2008, https://technet.microsoft.com/en-us/library/cc749064(v=ws.10).aspx.

*Primary Examiner* — Katherine Lin
(74) *Attorney, Agent, or Firm* — HP Inc. Patent Department

(57) ABSTRACT

An example computing device includes a connector to establish a wired connection with an electronic device. The computing device also includes a storage device storing a firmware. The firmware is to, in response to detecting a recovery trigger to repair an operating system of the electronic device, identify an operating system of the electronic device. The firmware is also to establish a communication channel between the computing device and the electronic device based on the operating system of the electronic device. The firmware is further to map a virtual network interface of the computing device to a transceiver of the electronic device and retrieve recovery data from a repository via the virtual network interface. The recovery data is transported to the computing device via the communication channel.

15 Claims, 4 Drawing Sheets

(56) References Cited

U.S. PATENT DOCUMENTS

| | | |
|---|---|---|
| 9,110,679 B1 | 8/2015 | Chan et al. |
| 2001/0049775 A1 | 12/2001 | Rechberger et al. |
| 2004/0153724 A1 | 8/2004 | Nicholson et al. |
| 2006/0206300 A1 | 9/2006 | Garg et al. |
| 2006/0242395 A1 | 10/2006 | Fausak |
| 2012/0272090 A1* | 10/2012 | Poisner ............... G06F 11/1415 |
| | | 714/3 |

* cited by examiner

OPERATING SYSTEM REPAIRS VIA ELECTRONIC DEVICES

BACKGROUND

An operating system of a computing device may control many aspects of computing device. When the operating system is corrupted or damaged, the operations of the computing device may be severely limited or the computing device may be rendered inoperable.

BRIEF DESCRIPTION OF THE DRAWINGS

Some examples of the present application are described with respect to the following figures.

DETAILED DESCRIPTION

Figure 1:
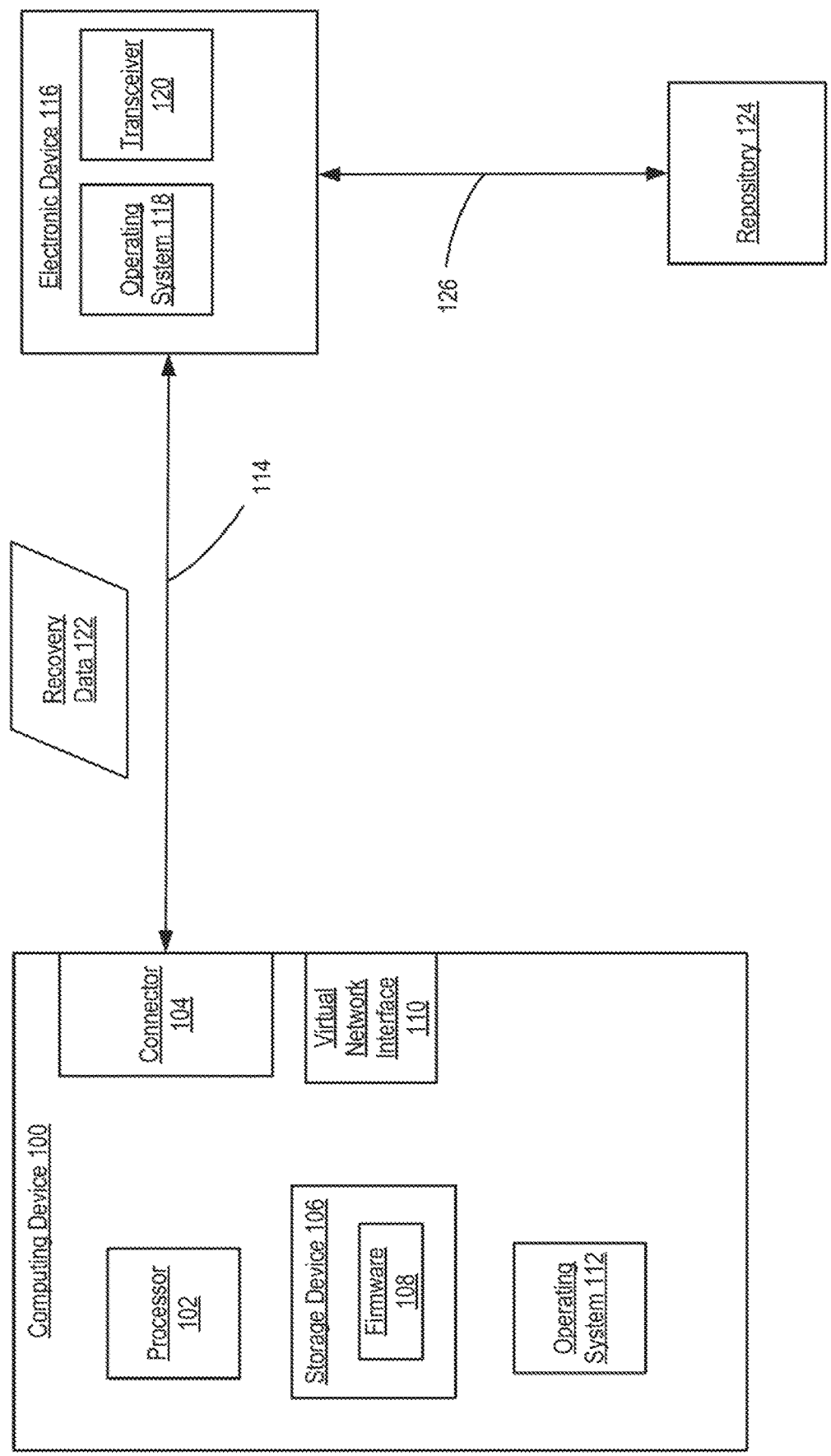
FIG. 1 illustrates a computing device to repair an operating system of the computing device via an electronic device, according to an example.

When an operating system of a computing device is corrupted or damaged, the operating system may be repaired via a recovery operation. Without the use of the operating system, the computing device may have limited network capabilities. For example, the computing device may not use a wireless transceiver to access a remote server to retrieve recovery data for the recovery operation. If the operating system becomes corrupt when the computing device is at a location where the only option to retrieve recovery data is from a remote repository, then the recovery operation may be delayed until other recovery options become available (e.g., by using an external media).

Examples described herein provide an approach to repair an operating system via an electronic device. For example, a computing device may include a connector to establish a wired connection with an electronic device. The computing device may also include a storage device storing a firmware. The firmware may, in response to detecting a recovery trigger to repair an operating system of the electronic device, identify an operating system of the electronic device. The firmware may also establish a communication channel between the computing device and the electronic device based on the operating system of the electronic device. The firmware may further map a virtual network interface of the computing device to a transceiver of the electronic device. The firmware may further retrieve recovery data from a repository via the virtual network interface. The recovery data may be transported to the computing device via the communication channel.

In another example, a non-transitory computer-readable storage medium may include instructions that when executed cause a processor of a computing device to, in response to detecting a recovery trigger to repair an operating system of the computing device, identify an operating system of an electronic device via a firmware of the computing device. The electronic device may be connected to a connector of the computing device via a wired connection. The instructions when executed may also cause the processor to select a communication protocol to enable network connection sharing between the computing device and the electronic device based on the operating system of the electronic device via the firmware; map a virtual network interface of the computing device to a transceiver of the electronic device via the firmware; and retrieve recovery data from a repository via the virtual network interface. The recovery data may be transported to the computing device via the communication protocol.

In another example, a non-transitory computer-readable storage medium may include instructions that when executed cause a processor of a computing device to, in response to detecting a recovery trigger to repair an operating system of the computing device, during a pre-boot phase of the computing device: identify an operating system of an electronic device, wherein the electronic device is connected to a connector of the computing device via a wired connection; select a communication protocol to network connection sharing between the computing device and the electronic device based on the operating system of the electronic device; map a virtual network interface of the computing device to a transceiver of the electronic device; retrieve recovery data from a repository via the virtual network interface; and repair the operating system of the computing device using the recovery data. The recovery data may be transported to the computing device via the communication protocol. Examples described herein may also increase the flexibility and/or convenience associated with repairing an operating system.

FIG. 1 illustrates a computing device 100 to repair an operating system of computing device 100 via an electronic device, according to an example. Computing device 100 may be, for example, a web-based server, a local area network server, a cloud-based server, a notebook computer, a desktop computer, an all-in-one system, a tablet computing device, a mobile phone, an electronic book reader, or any other electronic device suitable to repair an operating system via an external electronic device.

Computing device 100 may include a processor 102, a connector 104, a storage device 106, a firmware 108 stored in storage device 106, a virtual network interface 110, and an operating system 112. Processor 102 may control operations of computing device 100.

Connector 104 may a physical interface that connects computing device 100 to another device to enable data communication between computing device 100 and the other device. In some examples, connector 104 may be implemented as a Universal Serial Bus (USB) connector. In some examples, storage device 106 may be implemented using non-volatile memory, such as hard disk drives, solid state storage, flash memory, Electrically Erasable Programmable Read-Only Memory (EEPROM), etc. In some examples, storage device 106 may store firmware 108.

Firmware 108 may perform hardware initialization and/or configuration of components (such as storage device 106, processor 102, etc.) of computing device 100. Firmware 108 may also perform runtime services for operation system(s) and application(s) executing at computing device 100. In some examples, firmware 108 may be implemented as a Unified Extensible Firmware Interface (UEFI). Virtual network interface 110 may connect computing device 100 to a network. Operating system 112 may control and manage resources (hardware and software) of computing device 100. Operating system 112 may take control of computing device 100 when the boot up process of computing device 100 is completed and firmware 108 passes control to operating system 112.

During operation, computing device 100 may establish a wired connection 114 with an electronic device 116 via connector 104. In some examples, the wired connection 114 may be compliant with a bus transport protocol, such as a Universal Serial Bus (USB) protocol.

Firmware 108 may determine if operating system 112 is to be repaired. In some examples, firmware 108 may initiate a recovery operation in response to detecting a recovery trigger. A recovery trigger may be an event that informs firmware 108 a recovery operation is to be initiated. A recovery trigger may include:

an operating system failure, such as operating system corruption due to malware attack;

a failure to execute the operating system, such as when an operating system fails to load after a Power-On Self-Test (POST);

an external recovery instruction, such as a user initiated keypress during boot-time, a command from a system administrator, etc.;

a recovery instruction from a monitoring application, such as a software application that monitors the health of computing device 100; or a combination thereof.

Firmware 108 may initiate a recovery operation from a secure, stable state. Thus, even though firmware 108 may have detected the recovery trigger(s) at various points in the pre-boot through runtime environment, firmware 108 may not immediately initiate the recovery operation. Instead, firmware 108 may initiate the recovery operation during a pre-boot phase subsequent to the detection of a recovery trigger. A pre-boot phase may be the period immediately after the completion of a Power-On-Self-Test (POST) of computing device 100 and before the loading of operating system 112. For example, during the runtime environment (i.e., operating system 112 may be executing), firmware 108 may detect a recovery trigger. Computing device 100 then may be rebooted. During the pre-boot phase of the reboot process, firmware 108 may initiate the recovery operation.

During the recovery operation, firmware 108 may identify an operating system 118 of electronic device 116. For example, firmware 108 may determine if operating system 118 is a Windows operating system, an Android operating system, an iPhone Operating System (iOS), a macOS operating system, a Linux operating system, etc. When firmware 108 determines the identity or type of operating system 118, firmware 108 may select a communication protocol to enable network connection sharing between computing device 100 and electronic device 116.

Firmware 108 may select a first communication protocol when electronic device 116 has a first operating system. Firmware 108 may select a second communication protocol when electronic device has a second operating system. For example, firmware 108 may select a Remote Network Driver Interface Specification (RNDIS) as the communication protocol when operating system 118 is a Windows operating system. Firmware 108 may select a USB Communications Device Class and Ethernet Control Model (CEC-ECM) protocol as the communication protocol when operating system 118 is a Linux operating system.

Firmware 108 may use the selected communication protocol to establish a communication channel between computing device 100 and electronic device 116 to transmit and receive data via a network connection of electronic device 116. In some examples, the communication channel may be a virtual Ethernet channel.

Firmware 108 may map virtual network interface 110 to a transceiver 120 of electronic device 116 so that data exchanged using transceiver 120 may be in the correct format. For example, electronic device 116 may have access to a cellular data network via transceiver 120, such as a Long-Term Evolution (LTE) network. To exchange data on the cellular data network, the data may be in a format compliant with the LTE protocol. When virtual network interface 110 receives data to be transmitted via transceiver 120, virtual network interface 110 may perform protocol translation so that the data is in a format complaint with the LTE protocol. Then the data may be transported to transceiver 120 via the communication channel for transmission to the cellular data network. Similarly, when data received virtual network interface 110 via the cellular data network (e.g., from a remote server). Virtual network interface 110 may perform protocol translation on the data so that the data is in a format compatible with computing device 100.

To repair operating system 112, firmware 108 may retrieve recovery data 122 from a repository 124 via a network connection 126 of electronic device 116. In some examples, network connection 126 may be a Wi-Fi connection, a cellular data network connection (e.g., a LTE network), or any other Ethernet network. In some examples, recovery data 122 may be an image of operating system 112 (e.g. a file containing the complete contents and structure of operating system 112). When firmware 108 receives recovery data 122, firmware 108 may repair operating system 112 using recovery data 122. In some examples, repository 124 may be implemented as a cloud storage (e.g., a public cloud or a private cloud), a remote server, or any other storage accessible via a network connection.

In some examples, repairing operating system 112 may include replacing the current copy of operating system 112 with a new copy of operating system 112 (e.g., re-imaging operating system 112 using recovery data 122), replacing portions of operating system 112 with new copies of the corresponding files, or a combination thereof.

Figure 2:
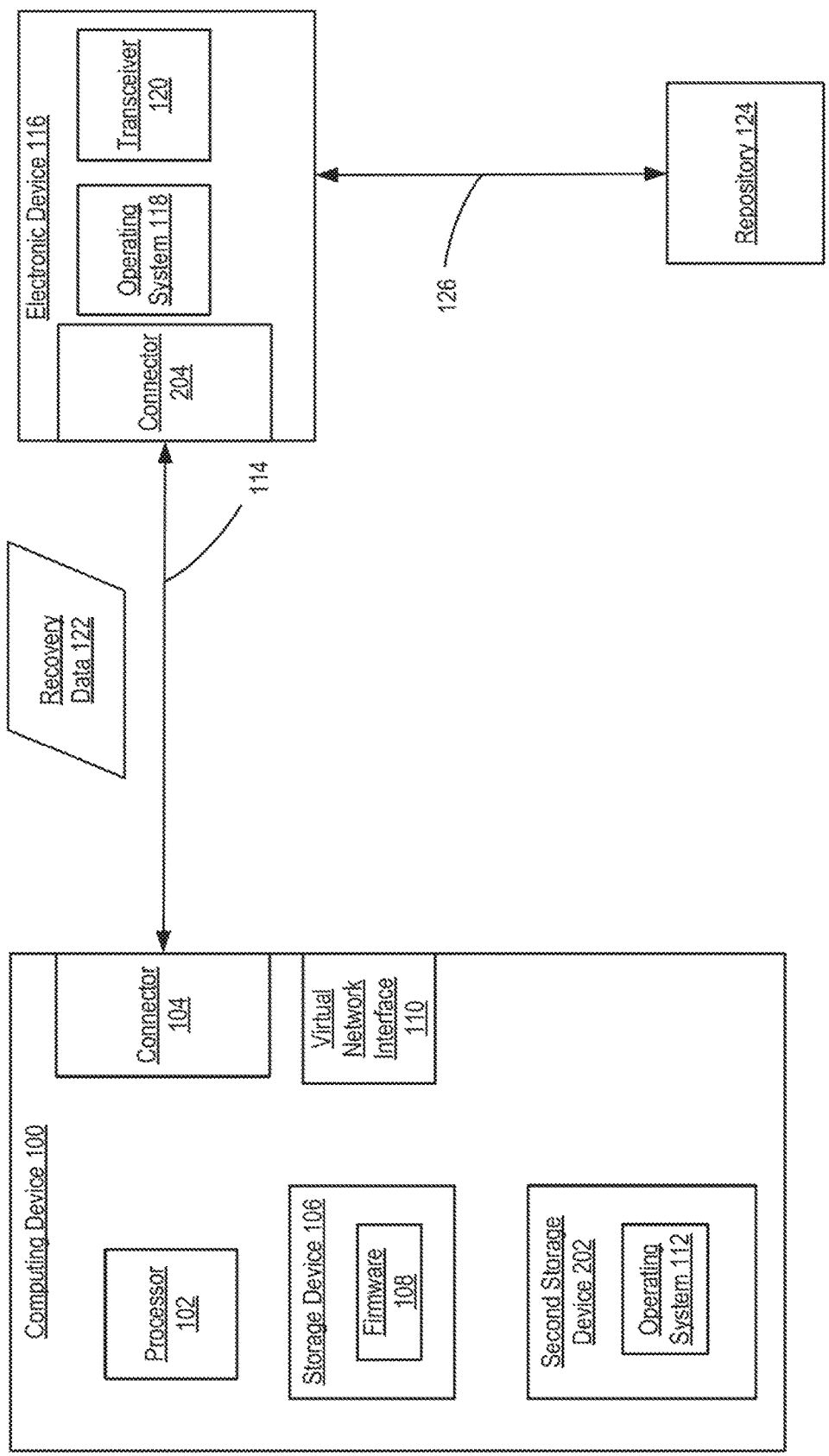
FIG. 2 illustrates a computing device to repair an operating system of the computing device via an electronic device, according to another example.

FIG. 2 illustrates computing device 100 to repair an operating system of computing device 100 via an electronic device, according to another example. In some examples, computing device 100 may include a second storage device 202 to store operating system 112. Second storage device 202 may be similar to storage device 106. In some examples, electronic device 116 may include a connector 204 to establish wired connection 114 with computing device 100. Connector 204 may be similar to connector 104.

Figure 3:
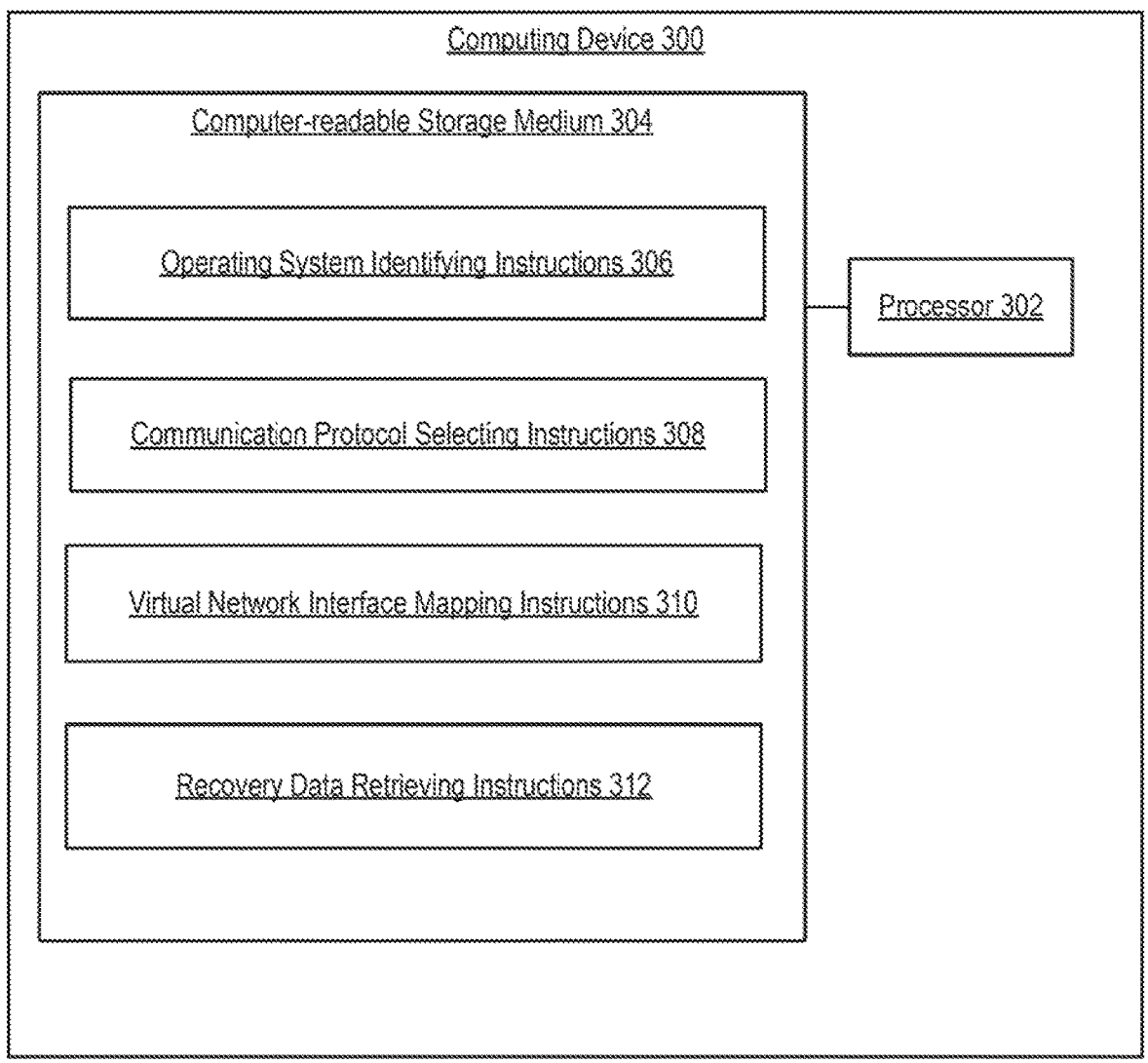
FIG. 3 illustrates a computing device to repair an operating system of the computing device via an electronic device, according to another example.

FIG. 3 illustrates a computing device 300 including to repair an operating system of computing device 300 via an electronic device, according to another example. Computing device 300 may implement computing device 100 of FIGS. 1-2. Computing Device 300 may include a processor 302 and a computer-readable storage medium 304.

Processor 302 may be a central processing unit (CPU), a semiconductor-based microprocessor, and/or other hardware devices suitable for retrieval and execution of instructions stored in computer-readable storage medium 304. Computer-readable storage medium 504 may be any electronic, magnetic, optical, or other physical storage device that contains or stores executable instructions. Thus, computer-readable storage medium 504 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. Computer-readable storage medium 304 may be encoded with instructions 306-312.

Operating system identifying instructions 306 may identify an operating system of an electronic device connected to computing device. For example, referring to FIG. 1, firmware 108 may identify an operating system 118 of electronic device 116. Communication protocol selecting instructions 308 may select a communication protocol to enable network connection sharing between computing device 300 and a connected electronic device. For example, referring to FIG. 1, when firmware 108 determines the identity or type of operating system 118, firmware 108 may select a communication protocol to enable network connection sharing between computing device 100 and electronic device 116.

Virtual network interface mapping instructions 310 may map a virtual network interface to a transceiver of an electronic device. For example, referring to FIG. 1, firmware 108 may map virtual network interface 110 to a transceiver 120 of electronic device 116 so that data exchanged using transceiver 120 may be in the correct format. Recovery data retrieving instructions 312 may retrieve recovery data for an operating system recovery operation. For example, referring to FIG. 1, to repair operating system 112, firmware 108 may retrieve recovery data 122 from a repository 124 via a network connection 126 of electronic device 116.

Figure 4:
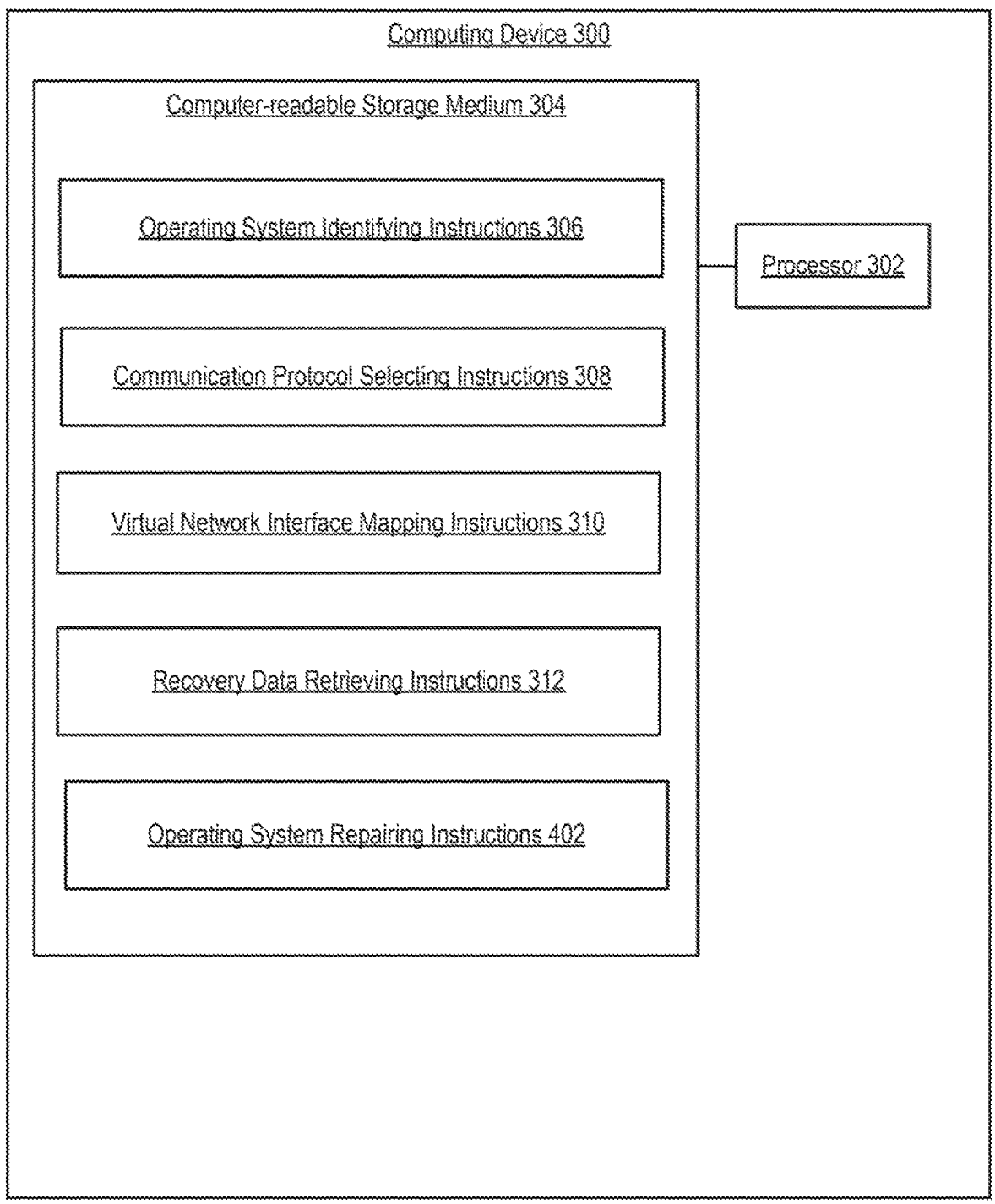
FIG. 4 illustrates a computing device to repair an operating system of the computing device via an electronic device, according to another example.

FIG. 4 illustrates computing device 300 to repair an operating system of the computing device via an electronic device, according to another example. In some examples, computing device may also include operating system repairing instructions 402 encoded in computer-readable storage medium 304. Operating system repairing instructions 402 may repair an operating system of computing device 300. For example, referring to FIG. 1, when firmware 108 receives recovery data 122, firmware 108 may repair operating system 112 using recovery data 122.

The use of "comprising", "including" or "having" are synonymous and variations thereof herein are meant to be inclusive or open-ended and do not exclude additional unrecited elements or method steps.

What is claimed is:

1. A computing device comprising:
   a connector to establish a wired connection with an electronic device;
   a storage device storing a firmware, wherein the firmware is to:
   in response to detecting a recovery trigger to repair an operating system of the computing device, identify an operating system of the electronic device;
   establish a communication channel between the computing device and the electronic device based on the operating system of the electronic device;
   map a virtual network interface of the computing device to a transceiver of the electronic device; and
   retrieve recovery data from a repository via the virtual network interface, wherein the recovery data is transported to the computing device via the communication channel.

2. The computing device of claim 1, wherein the communication channel is a virtual Ethernet channel.

3. The computing device of claim 1, wherein the wired connection is a Universal Serial Bus (USB) connection.

4. The computing device of claim 1, wherein the firmware is to establish the communication channel using a first communication protocol when the electronic device has a first operating system, and wherein the firmware is to establish the communication channel using a second communication protocol when the electronic device has a second operating system.

5. The computing device of claim 1, further comprising a second storage device, wherein the recovery data is stored in the second storage device.

6. A non-transitory computer-readable storage medium comprising instructions that when executed cause a processor of a computing device to:
   in response to detecting a recovery trigger to repair an operating system of the computing device, identify an operating system of an electronic device via a firmware of the computing device, wherein the electronic device is connected to a connector of the computing device via a wired connection;
   select a communication protocol to enable network connection sharing between the computing device and the electronic device based on the operating system of the electronic device via the firmware;
   map a virtual network interface of the computing device to a transceiver of the electronic device via the firmware; and
   retrieve recovery data from a repository via the virtual network interface, wherein the recovery data is transported to the computing device via the communication protocol.

7. The non-transitory computer-readable storage medium of claim 6, wherein the instructions when executed cause the processor to retrieve the recovery data during a pre-boot phase of the computing device.

8. The non-transitory computer-readable storage medium of claim 6, wherein the firmware implements a Unified Extensible Firmware Interface (UEFI).

9. The non-transitory computer-readable storage medium of claim 6, wherein the recovery trigger includes an operating system failure, a failure to execute the operating system of the computing device, an external recovery instruction, a recovery instruction from a monitoring application, or a combination thereof.

10. The non-transitory computer-readable storage medium of claim 6, wherein the virtual network interface is to perform protocol translation.

11. A non-transitory computer-readable storage medium comprising instructions that when executed cause a processor of a computing device to:
   in response to detecting a recovery trigger to repair an operating system of the computing device, during a pre-boot phase of the computing device:
   identify an operating system of an electronic device, wherein the electronic device is connected to a connector of the computing device via a wired connection;
   select a communication protocol to enable network connection between the computing device and the electronic device based on the operating system of the electronic device;
   map a virtual network interface of the computing device to a transceiver of the electronic device;
   retrieve recovery data from a repository via the virtual network interface, wherein the recovery data is transported to the computing device via the communication protocol; and
   repair the operating system of the computing device using the recovery data.

12. The non-transitory computer-readable storage medium of claim 11, wherein the recovery data is an operating system image.

13. The non-transitory computer-readable storage medium of claim 11, wherein the wired connection is compliant with a bus transport protocol.

14. The non-transitory computer-readable storage medium of claim 11, wherein the recovery trigger includes an operating system failure, a failure to execute the operating system of the computing device, an external recovery instruction, a recovery instruction from a monitoring application, or a combination thereof.

15. The non-transitory computer-readable storage medium of claim 11, wherein the instructions when executed further cause the processor to:
  select a first communication protocol when the electronic device has a first operating system; and
  select a second communication protocol when the electronic device has a second operating system.

* * * * *